United States Patent
Cowell et al.

(10) Patent No.: US 6,491,876 B2
(45) Date of Patent: Dec. 10, 2002

(54) HYDROGEN CYANIDE PROCESS AND APPARATUS THEREFOR

(75) Inventors: Christopher Cowell, Stockton (GB); Ralph Doy, Northwich (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/029,536

(22) PCT Filed: Aug. 29, 1996

(86) PCT No.: PCT/GB96/02103

§ 371 (c)(1), (2), (4) Date: Dec. 21, 1998

(87) PCT Pub. No.: WO97/09273

PCT Pub. Date: Mar. 13, 1997

(65) Prior Publication Data

US 2002/0039553 A1 Apr. 4, 2002

(30) Foreign Application Priority Data

Sep. 1, 1995 (EP) ............................................. 95113796

(51) Int. Cl.$^7$ ............................. C01C 3/02; F28D 7/00
(52) U.S. Cl. ...................... 422/161; 422/200; 422/201; 422/211; 422/224; 422/228; 423/375; 423/376
(58) Field of Search ................................. 422/161, 200, 422/201, 211, 224, 228, 375; 423/375, 376

(56) References Cited

U.S. PATENT DOCUMENTS

| | | | |
|---|---|---|---|
| 1,934,838 A | 11/1933 | Andrussow | |
| 2,803,522 A | * 8/1957 | Inman | 423/376 |
| 3,104,945 A | 9/1963 | Jenks | |
| 3,112,177 A | * 11/1963 | Fujise et al. | 423/375 |
| 3,215,495 A | 11/1965 | Jenks | |
| 3,376,500 A | 4/1968 | Albanese et al. | |
| 4,107,278 A | 8/1978 | Wang | |
| 4,128,622 A | 12/1978 | Loos | |
| 5,266,291 A | * 11/1993 | Drnevich et al. | 423/376 |
| 5,360,603 A | * 11/1994 | Drnevich et al. | 423/376 |

FOREIGN PATENT DOCUMENTS

| | | | |
|---|---|---|---|
| DE | 10 05 049 | 3/1957 | |
| DE | 1 161 870 | 1/1964 | |
| DE | 11 90 445 | 4/1965 | |
| GB | 1120237 | * 7/1968 | 423/376 |
| PL | 109 343 | 11/1981 | |

OTHER PUBLICATIONS

Sedriks Walter, "Hydrogen Cyanide from Methanol," SRI International Process Economics Program, 1976, pp. 49–64. (No month).

* cited by examiner

*Primary Examiner*—Wayne Langel
(74) *Attorney, Agent, or Firm*—Pillsbury Winthrop LLP

(57) ABSTRACT

A catalytic process and apparatus therefor for the manufacture of hydrogen cyanide. In the process an oxygen rich oxidant stream and at least one oxidant-free feed stream containing methane and ammonia are separately preheated and rapidly mixed to form a detonable mixed stream at a temperature which is at least 50° C. below the autoignition temperature of the mixed stream. The mixed stream is then conveyed to a catalyst capable of catalyzing the formation of hydrogen cyanide at such a velocity that detonation is avoided. The process is more energy efficient and gives rise to an effluent stream containing more hydrogen than the conventional Andrussow process.

2 Claims, 2 Drawing Sheets

HYDROGEN CYANIDE PROCESS AND APPARATUS THEREFOR

The present invention relates to a process for the manufacture of hydrogen cyanide (HCN) and apparatus for use in such a process.

Conventionally, HCN is produced by the so-called Andrussow process, as described in U.S. Pat. Nos. 1,934,838, 4,107,278 and 4,128,622, and in which process ammonia and methane are combusted in air over a platinum-group metal catalyst to produce an effluent stream containing HCN. As a consequence of using air as the source of oxygen, the combustion is inevitably performed in the presence of a large volume of inert nitrogen. This large volume of nitrogen necessitates the use of appropriately sized air compressors and downstream equipment. Additionally, because of the presence of the inert nitrogen, more methane is required to be combusted than that needed merely to raise the temperature of the reactants to a temperature at which the HCN reaction can be sustained over the catalyst. Furthermore, the effluent gas which contains the HCN also contains by-product hydrogen and water, and residual ammonia. However, after separation of the HCN and recoverable ammonia from the other gaseous components, the presence of the inert nitrogen renders the residual gaseous stream of such low fuel value that it is requires its own dedicated burner.

For optimum conditions, the Andrussow process is operated within the flammable limits of the ammonia and methane mixture. The use of oxygen enriched air moves the process closer to the detonable region which makes operation extremely hazardous and as such is conventionally prohibitively difficult to control.

In the present invention, the process is operated such that potentially detonable mixtures of reactants are formed but in such a manner that detonation is avoided. This gives rise to improvements in the energy efficiency of the process and provides an effluent gas stream which has a significantly higher hydrogen content than that obtained from conventional Andrussow processes.

Accordingly, in a first aspect the present invention provides a catalytic process for the manufacture of hydrogen cyanide, which process comprises (a) forming
   (i) an oxygen rich oxidant stream
   (ii) at least one oxidant-free feed stream supplying methane and ammonia;
(b) separately preheating by indirect heat exchange at least one of said oxidant and feed streams to a respective oxidant and feed preheat temperature;
(c) rapidly mixing sufficient of the oxidant and feed streams at their respective preheat temperatures in a mixing zone to form a detonable mixed stream at a mixed temperature and which mixed temperature is at least 50° C. below the autoignition temperature of the mixed stream;
(d) conveying the mixed stream through the mixing zone at a mixing velocity such that detonation of the mixed stream is avoided; and thereafter
(e) feeding the mixed stream to a catalyst capable of catalysing the formation of hydrogen cyanide from the mixed stream at the mixed temperature to form an effluent stream containing hydrogen cyanide.

In a second aspect the present invention provides an apparatus for use in the process of the first aspect of the invention, which apparatus comprises (a) a first inlet for an oxygen rich oxidant stream;
(b) at least one second inlet for at least one oxidant-free feed stream supplying methane and ammonia;
(c) a first conduit connected to said first inlet and along which the oxidant stream is able to flow from said first inlet to a discharge end of the first conduit;
(d) at least one second conduit connected to said at least one second inlet and along which the at least one feed stream is able to flow from the at least one second inlet to a discharge end of said at least one second conduit and which discharge end is approximately coterminous with the discharge end of said first conduit;
(e) a mixing zone located at the discharge end of the first conduit for receiving the oxidant and feed streams;
(f) a mixing means located in the mixing zone for effecting rapid mixing of the oxidant and feed streams to form a detonable mixed stream and for conveying the mixed stream through the mixing zone at a mixing velocity such that detonation of the mixed stream is avoided;
(g) a discharge orifice providing a flow connecting means between the mixing zone and a deflagration arrestor and through which the mixed stream is able to flow, the deflagration arrestor capable of inhibiting the propagation of a deflagration of the mixed stream back through the discharge orifice into the mixing zone; and
(h) a reaction zone for receiving the mixed stream from the deflagration arrestor and for directing the mixed stream to a supported catalyst located in the reaction zone for promoting the formation of hydrogen cyanide from the detonable mixed stream;
(i) indirect heat exchange means for preheating at least one of said oxidant and feed streams prior to mixing.

The oxygen rich oxidant stream typically contains from 30 to 100% by volume of oxygen. Preferably, the oxidant stream contains from 50 to 100% by volume of oxygen and in particular from 80 to 100% by volume.

The at least one oxygen-free feed stream may provide the methane and ammonia as separate feed streams which are then separately mixed with the oxygen rich oxidant stream. Preferably, the oxidant free feed stream is a premixed stream containing a mixture of methane and ammonia. Suitably, the volume (and hence molar) ratio of ammonia to methane used in the present process is from 1:1 to 1:1.5, preferably from 1:1 to 1:1.3 and particularly from 1:1 to 1:1.2.

The oxidant and feed streams may contain other components, for example a feed stream containing methane and ammonia may also contain a small proportion of oxygen provided that the composition of the feed stream is outside the detonable region.

In addition to the use of an oxygen rich oxidant stream, the need to use a significant excess of methane is further avoided in the present invention by indirectly preheating at least one of the oxidant and feed streams to a preheat temperature such that when the streams are mixed and passed over a catalyst capable of catalysing the formation of hydrogen cyanide the reaction is sustained and proceeds at a desired catalyst temperature. Where the oxidant stream is preheated it is advisable to avoid such temperatures that could give rise to metallurgical problems. Preferably, the oxidant stream is preheated to a temperature in the range from 200 to 300° C. and the at least one feed stream is preheated to a temperature in the range from 300 to 450° C. The preheat temperatures are preferably chosen such that the mixed temperature from 200 to 400° C., preferably from 300 to 430° C. and particularly from 330 to 430° C. is achieved.

Use of such reaction temperatures normally results in a catalyst temperature of from 1000 to 1250° C.

The effluent stream exit the catalyst is approximately at the catalyst temperature and thus represents a valuable source of high grade energy. Consequently, it is preferred that the effluent stream on exiting the catalyst is used in indirect heat exchange to raise useful high pressure steam and hence to provide a partially cooled effluent stream, typically at a temperature from 500 to 700° C., e.g. about 600° C. The partially cooled effluent stream may also be usefully employed in other indirect heat exchange stages and in particular may be used to preheat at least one of the oxidant and feed streams and hence to provide a cooled effluent stream, typically at a temperature from 200 to 400° C., e.g. 300° C.

Typically, the effluent stream contains from 15 to 20% by volume of HCN and from 30 to 40% by volume of hydrogen.

The preheating of at least one of the oxidant and feed streams may be performed by one or more separate preheating stages such that the streams are at least partially preheated on entry to the respective first and second conduits. Additionally or alternatively, the preheating may be performed whilst the streams flow along the conduits. Preferably, the preheating is performed by indirect heat exchange with the partially cooled effluent stream whilst the streams are flowing along the conduits.

Preferably, when each of the at least one oxidant free feed streams contain ammonia and methane, each first conduit is associated with and located within a second conduit. This simplifies the construction of the apparatus including the selection of the materials of construction. Particularly preferred is where each first conduit is associated with and located within a second conduit and the partially cooled effluent stream is in indirect heat exchange with the feed stream as the feed stream flows along the second conduit. In this particularly preferred situation the length of the second conduit is dependent on the required preheat temperature to be achieved; in the case where the feed stream is preheated prior to entry into the second conduit then the length of the second conduit may be shorter than in the case where the same preheat temperature is achieved solely within the second conduit. However, in any event, the maximum temperature to which the feed stream is preheated should be less than the autoignition temperature of the methane and ammonia mixture.

The supported catalyst bed may be formed from materials conventionally used to promote the formation of hydrogen cyanide from oxygen, methane and ammonia, e.g. platinum-group metal catalysts. Preferably, a sintered metal or ceramic flame trap is positioned before the catalyst bed in order to inhibit the propagation of any undesirable flame fronts from the catalyst bed to the deflagration arrestors.

The present invention is also further described by reference to the accompanying figures in which.

Figure 1:
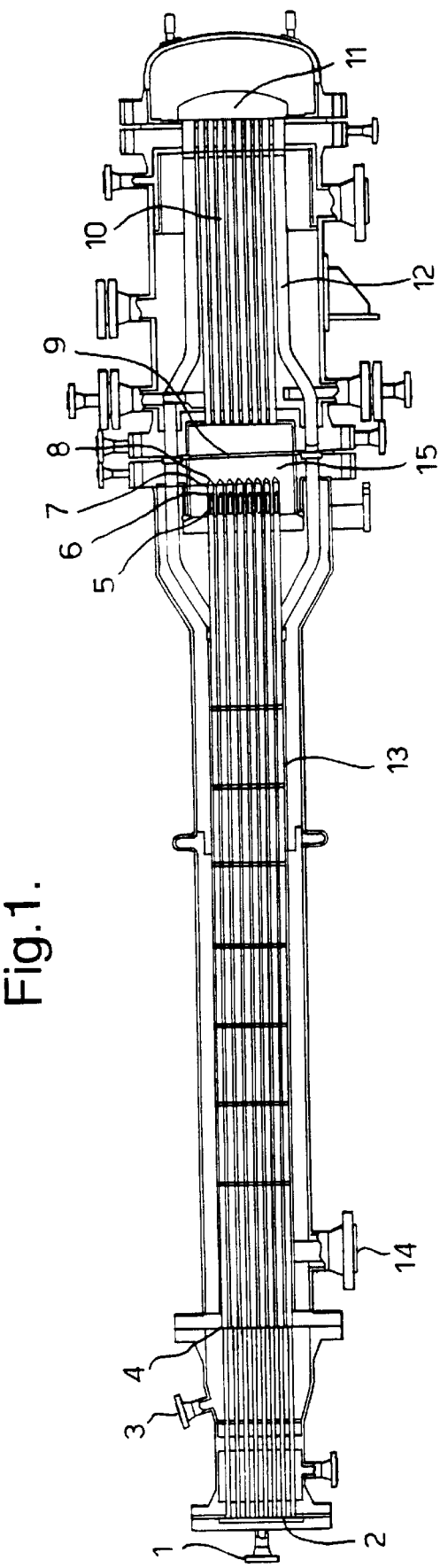
FIG. 1 represents a general layout of an apparatus according to the second embodiment of the present invention.

In FIG. 1, an oxygen rich oxidant stream is introduced into the apparatus via a first inlet (1). Within the apparatus, the oxidant stream is divided amongst a number of first conduits each having an inlet end (2) and a discharge end (5). A premixed oxidant-free feed stream containing methane and ammonia is introduced into the apparatus via a second inlet (3). However, if desired, it is possible to separately introduce the methane and ammonia through two or more such second inlets. Within the apparatus, the feed stream is divided amongst a number of second conduits each having an inlet end (4) and a discharge end approximately coterminous with that of the first conduits. As shown, each first conduit is associated with and located within a second conduit such that the divided feed stream flows in the annuli formed between the first and second conduits. At the outlet end of each first conduit, the oxidant stream emerges into the feed stream and is mixed in a mixing means (6) to form a mixed stream at such a velocity that detonation of the mixed stream is avoided. After mixing, the mixed stream then proceeds via a discharge orifice (7) to a deflagration arrestor (8) which inhibits the propagation of deflagration of the mixed stream.

The mixed stream is then received into a reaction zone (15) and from there is directed to a supported catalyst bed (9) capable of promoting the formation of hydrogen cyanide. The effluent stream exit the catalyst bed (9) is then cooled by passing it through an indirect heat exchanger (10), which as shown is a steam raising boiler, to form a partially cooled effluent stream at the heat exchanger exit (11). The partially cooled effluent stream is then routed via at least one effluent conduit (12) so as to flow against the external surface of each second conduit held within a heat exchange section (13) of the apparatus and in a direction which is counter current to the flow of the oxidant and feed streams thereby preheating at least the feed stream and cooling the partially cooled effluent stream to exit from the apparatus via outlet (14). On exit from the apparatus the hydrogen cyanide present in the effluent stream can be recovered using conventional separation techniques.

Figure 2:
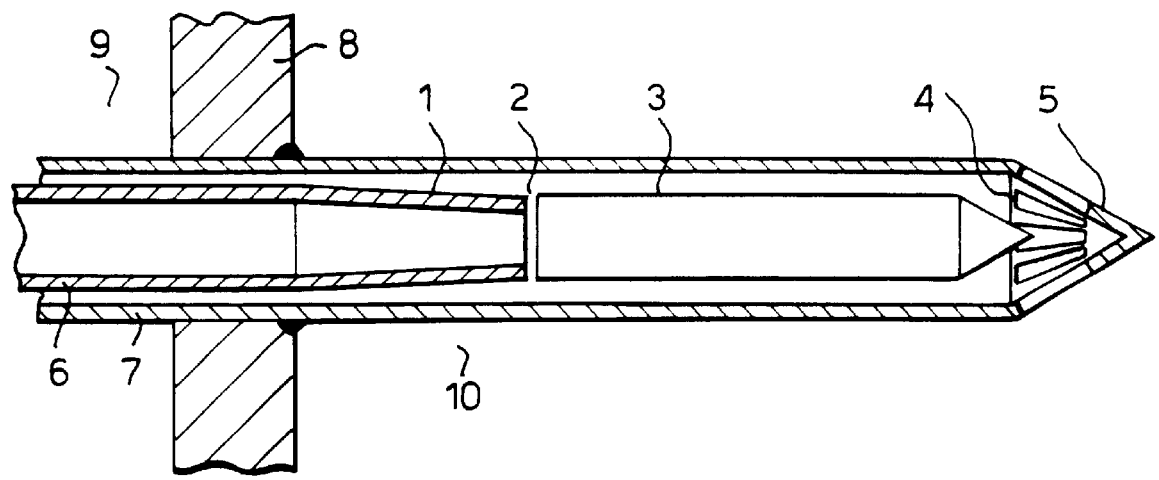
FIG. 2 represents an enlarged view of a mixing zone as used in the present invention.

In FIG. 2, a first conduit (6) is associated with and located within a second conduit (7) as described in FIG. 1. The first conduit (6) and second conduit (7) pass from a heat exchange section (9) through a tube sheet (8) into a reaction zone (10). The discharge end of the first conduit has a tapered section (1) which serves to increase the flow area available to the feed stream and a series of radially connecting holes (2) through which the oxidant stream flows to be mixed with the feed stream. The oxidant and feed streams are then mixed in a mixing means (3). Within the mixing means high shear forces are encouraged to promote rapid mixing and the velocity of the mixed stream is maintained as high as possible. On exit from the mixing means (3), the mixed stream flows through a discharge orifice (4) which provides flow connection to a deflagration arrestor (5). After mixing the mixed stream is a detonable mixture of methane, ammonia and oxygen. Consequently, the volume available for flow downstream of the mixing means should be minimised. The deflagration arrestor (5) inhibits propagation of a potential detonation from the reaction zone (10) through to the mixing means (3). After passing through the deflagration arrestor (5) the mixed stream emerges into the reaction zone (10). Preferably, the deflagration arrestor is of a conical construction having slits through which the mixed gas flows thereby providing the mixed stream with a uniform velocity on approach to the catalyst bed.

Figure 3:
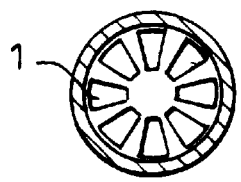
FIG. 3 represents a cross-section through a mixing means as used in the present invention.

In FIG. 3, the cross section shows the mixing channels (1) along which the oxidant and feed streams flow during mixing and which provide the necessary high shear forces and velocities.

The invention is further illustrated by reference to the following example.

EXAMPLE 1

When used to produce hydrogen cyanide from the following oxidant and feed streams

|  | kg/hr | kmol/hr |
|---|---|---|
| Oxidant Stream | | |
| Oxygen | 1211 | 37.9 |
| Nitrogen | 0 | 0 |
| Feed Stream (premixed) | | |
| Ammonia | 848 | 49.9 |
| Natural Gas (methane) | 777 | 45.7 | which have been preheated so as to achieve a reaction temperature of 400° C. the process of the present invention provides an effluent stream of the following composition (using a platinum metal catalyst operating at about 1100° C.)

|  | kg/hr | kmol/hr |
|---|---|---|
| HCN | 948.2 | 35.1 |
| Hydrogen | 165.7 | 82.9 |
| Water | 1040.0 | 57.8 |
| Ammonia | 127.9 | 7.6 |
| Carbon dioxide | 68.0 | 2.4 |
| Carbon monoxide | 379.0 | 8.6 |
| Nitrogen | 107.1 | 3.8 |

What is claimed is:

1. An apparatus for the manufacture of hydrogen cyanide, which apparatus comprises:

(a) a first inlet for an oxygen rich oxidant stream;

(b) at least one second inlet for at least one oxidant-free stream supplying methane and ammonia;

(c) a first conduit connected to said first inlet and along which the oxidant stream is able to flow from said first inlet to a discharge end of the first conduit;

(d) at least one second conduit connected to said at least one second inlet and along which the at least one feed stream is able to flow from the a least one second inlet to a discharge end of said at least one second conduit and which discharge end is approximately coterminous with the discharge end of said first conduit;

(e) a mixing zone located at the discharge end of the first conduit for receiving the oxidant and feed streams;

(f) a mixing means located in the mixing zone for effecting rapid mixing of the oxidant and feed streams to form a detonable mixed stream and for conveying the mixed stream through the mixing zone at a mixing velocity such that detonation of the mixed stream is avoided;

(g) a discharge orifice providing a flow connecting means between the mixing zone and a deflagration arrestor and through which the mixed steam is able to flow, the deflagration arrestor capable of inhibiting the propagation of deflagratgion of the mixed stream back through the discharge orifice into the mixing zone;

(h) a reaction zone for receiving the mixed stream from the deflagration arrestor and for directing the mixed stream to a supported catalyst located in the reaction zone for promoting the formation of hydrogen cyanide from the detonable mixed stream; and (i) indirect heat exchange means for preheating at least one of said oxidant and feed streams prior to mixing.

2. The apparatus in claim 1, wherein the first conduit is associated with, and located within, a second conduit.

* * * * *